(12) United States Patent
Wilson et al.

(10) Patent No.: US 11,451,014 B2
(45) Date of Patent: Sep. 20, 2022

(54) FUSE BANK FOR HVAC SYSTEMS

(71) Applicant: Johnson Controls Technology Company, Auburn Hills, MI (US)

(72) Inventors: Stephen C. Wilson, Oklahoma City, OK (US); Norman J. Blanton, Norman, OK (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 330 days.

(21) Appl. No.: 16/423,796

(22) Filed: May 28, 2019

(65) Prior Publication Data
US 2020/0358264 A1    Nov. 12, 2020

Related U.S. Application Data

(60) Provisional application No. 62/844,648, filed on May 7, 2019.

(51) Int. Cl.
*H01H 85/02* (2006.01)
*H02B 1/04* (2006.01)
(Continued)

(52) U.S. Cl.
CPC ........... *H02B 1/04* (2013.01); *H01H 85/0241* (2013.01); *H01H 85/20* (2013.01); *H02B 1/18* (2013.01); *H02B 1/56* (2013.01); *H05B 1/0205* (2013.01)

(58) Field of Classification Search
CPC ... H02B 1/04; H02B 1/18; H02B 1/56; H05B 1/0205; H01H 85/0241; H01H 85/20;
(Continued)

(56) References Cited

U.S. PATENT DOCUMENTS 3,566,325 A * 2/1971 Paganelli ........... H01H 85/2045
                                                       337/7
5,670,928 A * 9/1997 Cheng .................. H01H 85/202
                                                       337/188
(Continued)

FOREIGN PATENT DOCUMENTS

DE           1277423 B  *  9/1968  ............. H01H 85/20

OTHER PUBLICATIONS

Translation of DE 1277423 B. (Year: 1968).*

*Primary Examiner* — Jacob R Crum
(74) *Attorney, Agent, or Firm* — Fletcher Yoder, P.C.

(57) ABSTRACT

The present disclosure relates to a fuse bank design for a heating, ventilation, and/or air conditioning (HVAC) system. The disclosed stair-step design enables the positioning of electrical components of the fuse bank in a non-vertically aligned manner, which blocks the accumulation of heat in the upper electrical components as a result of convection heating from the lower components of the fuse bank during operation of the HVAC system. For example, a fuse bank is disclosed for an HVAC system that includes: a mounting surface; a first fuse block including a first fuse holder coupled to the mounting surface; a spacer coupled to the mounting surface vertically below the first fuse block; and a second fuse block including a second fuse holder coupled to the spacer, wherein the spacer offsets the second fuse block from the mounting surface of the fuse bank in a stair-step arrangement.

22 Claims, 10 Drawing Sheets

(51) Int. Cl.
  *H05B 1/02* (2006.01)
  *H02B 1/18* (2006.01)
  *H02B 1/56* (2006.01)
  *H01H 85/20* (2006.01)

(58) Field of Classification Search
  CPC ....... H01H 85/2045; H01H 2085/2075; H01H 2085/209
  See application file for complete search history.

(56) References Cited

U.S. PATENT DOCUMENTS

| | | | |
|---|---|---|---|
| 5,925,276 A * | 7/1999 | Batliwalla | H05B 3/146 219/553 |
| 6,380,838 B1 | 4/2002 | Fujii | |
| 6,495,901 B2 | 12/2002 | Brintzinger et al. | |
| 6,682,959 B2 | 1/2004 | Bang et al. | |
| 7,176,551 B2 | 2/2007 | Cheng et al. | |
| 8,860,175 B2 | 10/2014 | Jang | |
| 10,355,465 B2 * | 7/2019 | Matsumura | H02G 3/086 |
| 2002/0185706 A1 | 12/2002 | Ikegami | |
| 2003/0032332 A1 * | 2/2003 | Liang | H01H 85/205 439/620.27 |
| 2005/0135076 A1 * | 6/2005 | Haselby | H05K 5/0247 361/801 |
| 2005/0142956 A1 * | 6/2005 | Liang | H01R 13/68 439/816 |
| 2009/0174028 A1 | 7/2009 | Mun | |
| 2010/0032740 A1 | 2/2010 | Kitajima | |
| 2013/0162387 A1 * | 6/2013 | Kelley | H01H 37/761 337/142 |
| 2013/0201652 A1 * | 8/2013 | Bittner | H05K 7/02 361/834 |
| 2018/0329438 A1 * | 11/2018 | Letterman | F24F 11/74 |

* cited by examiner

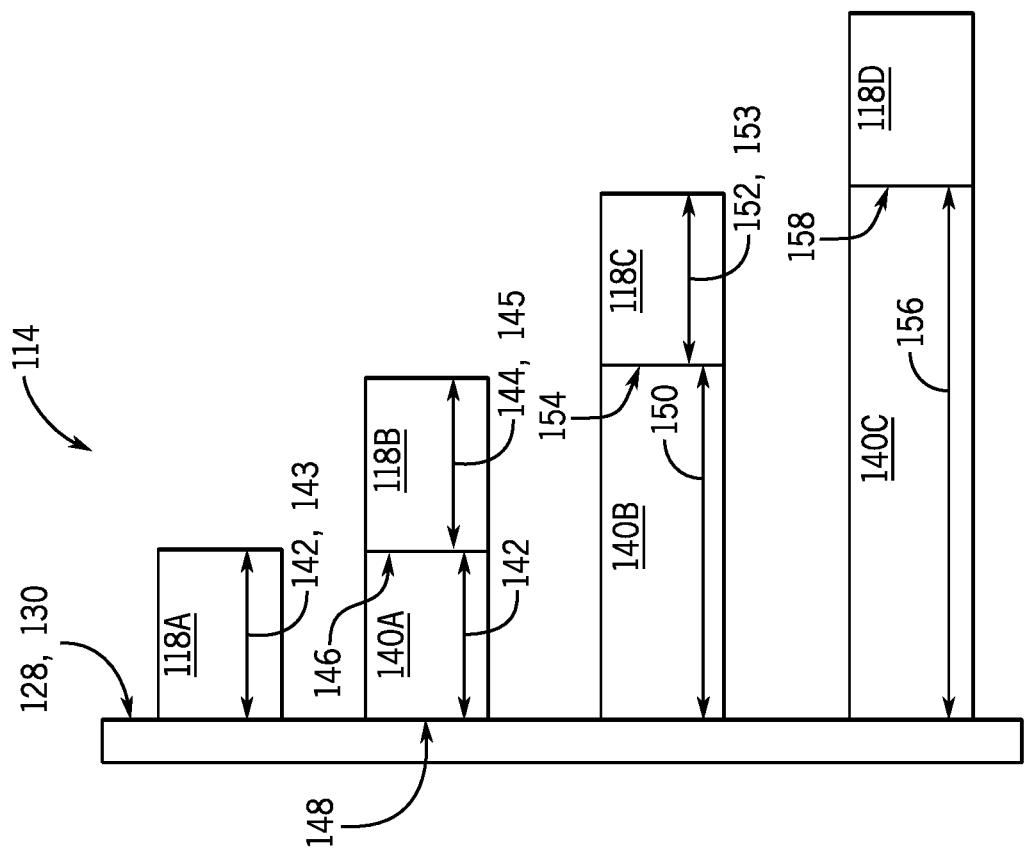
FIG. 6
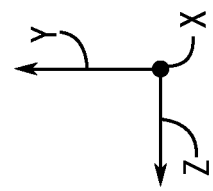

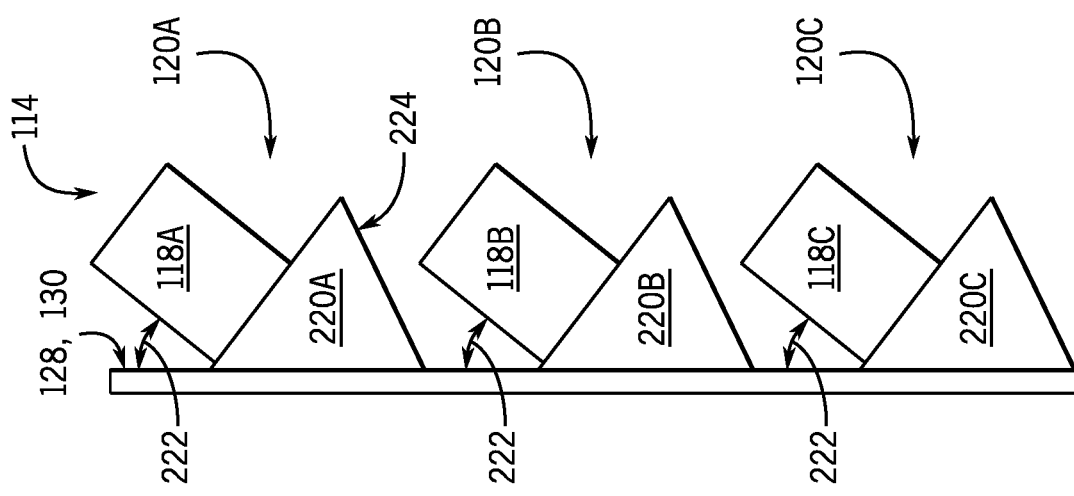
FIG. 11
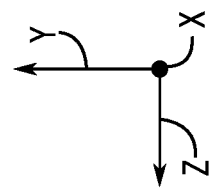

FUSE BANK FOR HVAC SYSTEMS

CROSS-REFERENCE TO RELATED APPLICATIONS

This application claims priority to U.S. Patent Provisional Application No. 62/844,648, entitled "FUSE BANK FOR HVAC SYSTEMS", filed May 7, 2019, which is herein incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

HVAC systems are used to control environmental properties, such as temperature and humidity, within a conditioned space. In particular, certain HVAC systems include an electric heater that warms supply, fresh, or recirculated air to heat the conditioned space. As such, these HVAC systems may include a fuse bank having electrical components, such as fuses, contactors, and relays, to enable operation of the electric heaters. For example, a HVAC system with a kilowatt-rated electric heater may receive a supply of three-phase power from a fuse bank, wherein each phase is delivered to the heater via a respective fuse block of the fuse bank. These electrical components generate heat during operation of the electric heater of the HVAC system. Additionally, certain electrical components are also sensitive to heat during operation and may not operate at rated levels at high temperatures. Furthermore, certain electrical components age or wear faster when operated at higher temperatures.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a fuse bank for a heating, ventilation and/or air conditioning system (HVAC), includes: a mounting surface; a first fuse block including a first fuse holder coupled to the mounting surface; a spacer coupled to the mounting surface vertically below the first fuse block; and a second fuse block including a second fuse holder coupled to the spacer, wherein the spacer offsets the second fuse block from the mounting surface of the fuse bank in a stair-step arrangement.

In another embodiment, a fuse block assembly for an electric heater includes a mounting surface and a first fuse block positioned along a first row of the fuse block assembly. The first fuse block includes a first set of fuse holders coupled to a first portion of the mounting surface, wherein the first set of fuse holders extend a first distance from a rear vertical plane defined by the fuse block assembly. The fuse block assembly also includes a second fuse block positioned along a second row of the fuse block assembly. The second fuse block assembly includes a second set of fuse holders coupled to a second portion of the mounting surface and positioned at a second distance from the rear vertical plane that is greater than the first distance.

In another embodiment, a heating, ventilation and/or air conditioning system (HVAC) includes an electric heater and a fuse bank electrically coupled to the electric heater. The fuse bank includes a mounting surface and a first fuse block that extends a first distance from the mounting surface. The fuse bank includes a second fuse block mounted to a first face of a first bracket, wherein the first bracket is coupled to the mounting surface vertically below the first fuse block and spaces the second fuse block from the mounting surface by at least the first distance, and wherein the second fuse block extends a second distance from the face of the first bracket. The fuse bank also includes a third fuse block mounted to a second face of a second bracket, wherein the second bracket is coupled to the mounting surface vertically below the second fuse block and spaces the third fuse block from the mounting surface by at least a sum of the first distance and the second distance.

BRIEF DESCRIPTION OF THE DRAWINGS

FIG. 6 is a schematic side view of an embodiment of the stair-step fuse bank, in accordance with an aspect of the present disclosure;

FIG. 11 is a schematic side view of an embodiment of the stair-step fuse bank that includes angled fuse blocks, in accordance with an aspect of the present disclosure.

DETAILED DESCRIPTION

Figure 1:
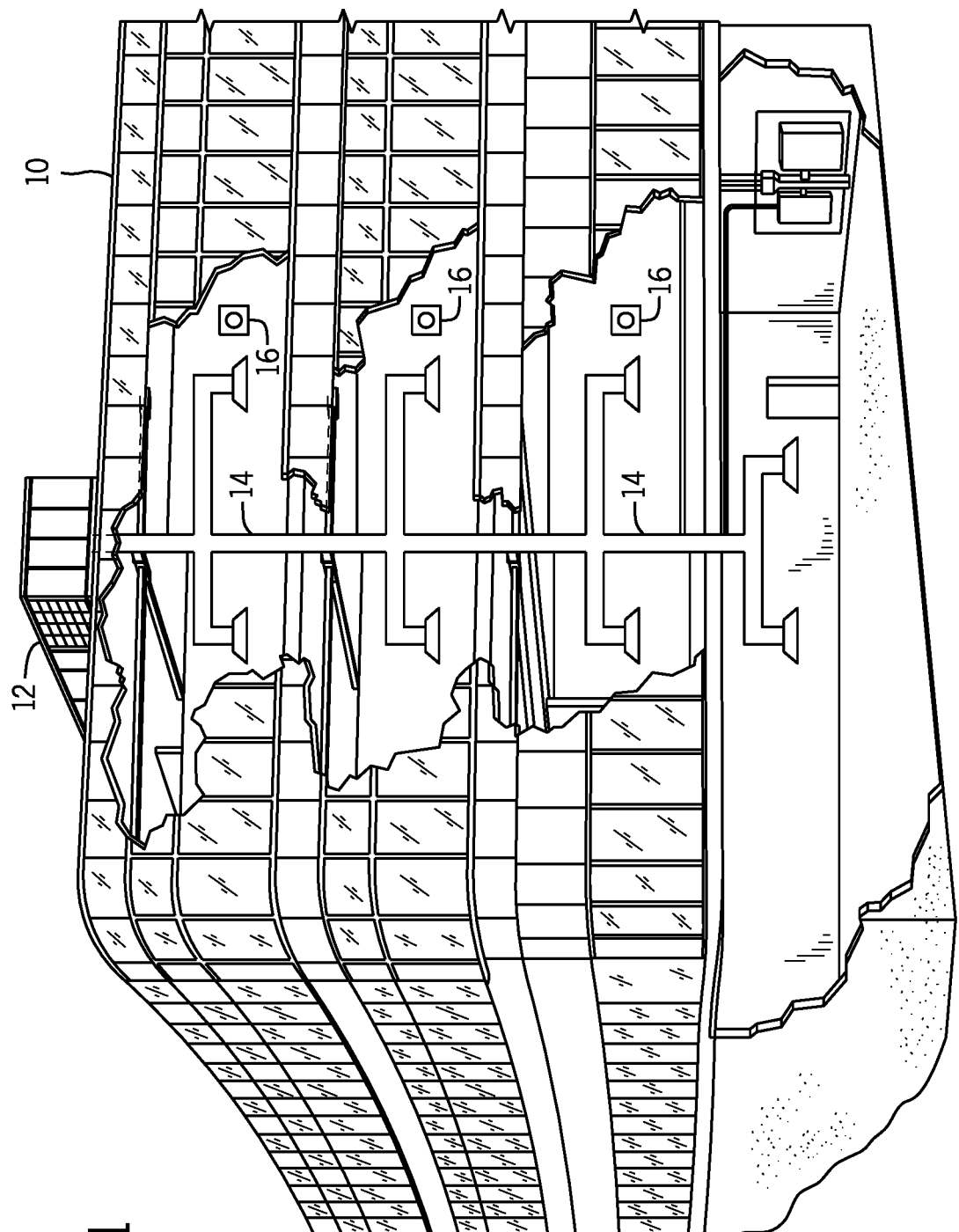
FIG. 1 is a perspective view of an embodiment of a commercial or industrial HVAC system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As set forth above, HVAC systems can include one or more electric heaters. As such, these HVAC systems include a fuse bank having electrical components to enable operation of the electric heaters. As used herein, "electrical components" may refer to electronic devices, such as fuse holders, fuses, contactors, relays, and so forth, that are used to deliver, transform, regulate, monitor, and/or condition power from an electrical power source to the electric heater. These electrical components generate heat during operation of the electric heater of the HVAC system. Certain electrical components are also sensitive to heat during operation and may not operate at rated levels at high temperatures. Additionally, certain electrical components can age or wear faster when operated at higher temperatures.

Moreover, when these electrical components are coupled to a vertical mounting surface of the fuse bank, the heat generated by the lower electrical components during operation of the electric heater warms the surrounding air. The less dense warm air then rises as a result of convection, and this warm air delivers additional heat to the upper electrical components of the fuse bank. Accordingly, the upper electrical components of the fuse bank are exposed to additional heat, even when operating within the rating of these components. For example, as a result of this heating, one or more fuses of an upper fuse block of a typical fuse bank may blow when operating at a rated voltage for an extended period, such as 4 to 6 hours. Additionally, as a result of this heating, the upper electrical components may also experience greater wear, thereby limiting the operational life of these components.

With the foregoing in mind, present embodiments are directed toward a stair-step fuse bank design. Within this disclosed stair-step fuse bank design, each fuse block is vertically offset such that the upper electrical components of the fuse bank are not disposed directly above the lower electrical components of the fuse bank. This substantially reduces the amount of heat delivered to the upper electrical components as a result of convection from heat generated by the lower electrical components of the fuse bank. As discussed below, the stair-step fuse block design may be achieved in a number of different manners, such as by using brackets, spacers, or a fuse block assembly. Since the fuse blocks are each differently spaced from the mounting surface of the disclosed stair-step fuse bank, the fuse blocks are not vertically aligned with each other, which blocks or reduces heating of the upper fuse blocks by the lower fuse blocks. As such, the disclosed stair-step fuse bank design enables the upper electrical components to operate at rated or above voltages, for example, 5% over rated voltages, for extended periods without performance degradation, thereby extending the life of the upper electrical components by limiting thermal exposure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
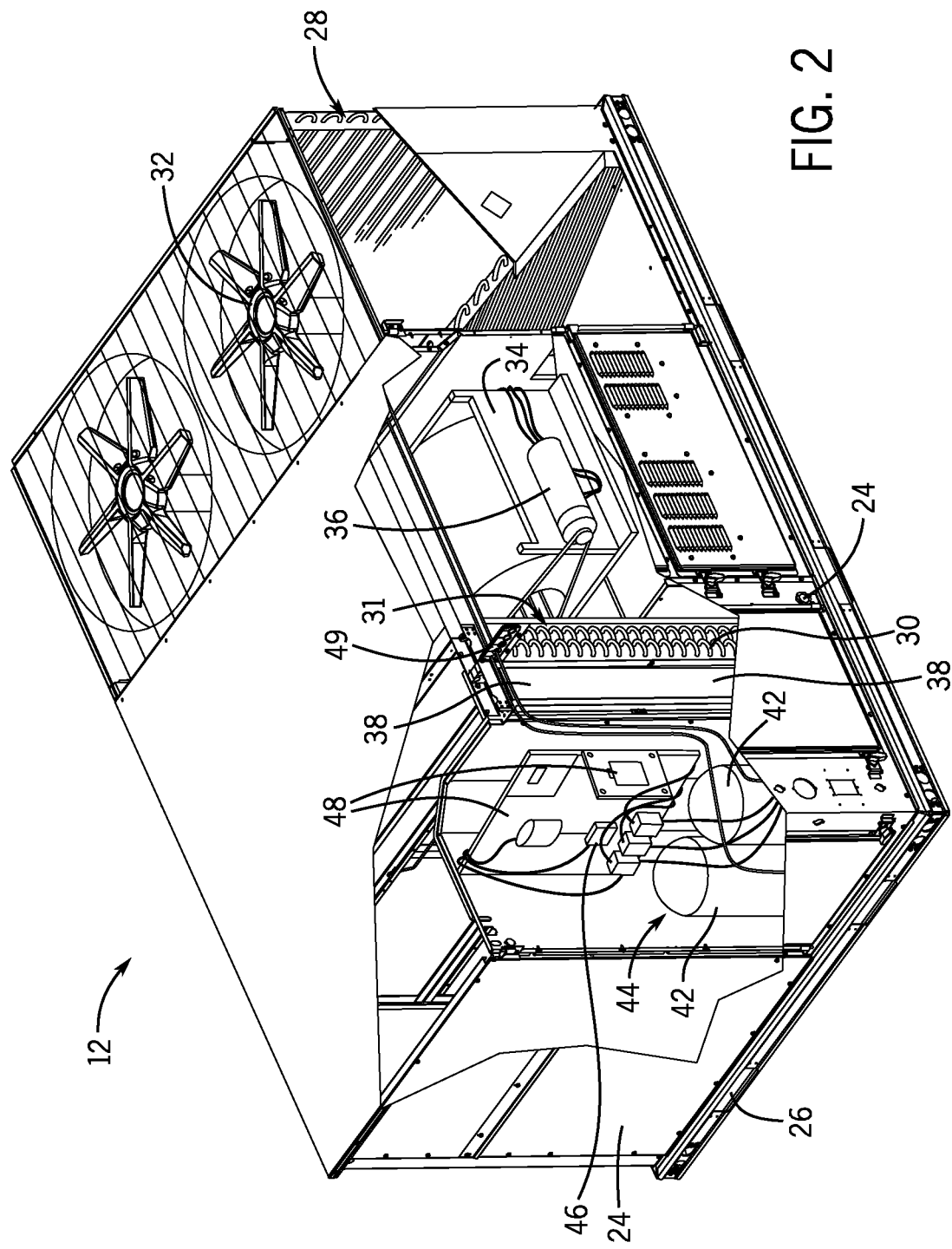
FIG. 2 is a perspective cutaway view of an embodiment of a packaged unit of an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
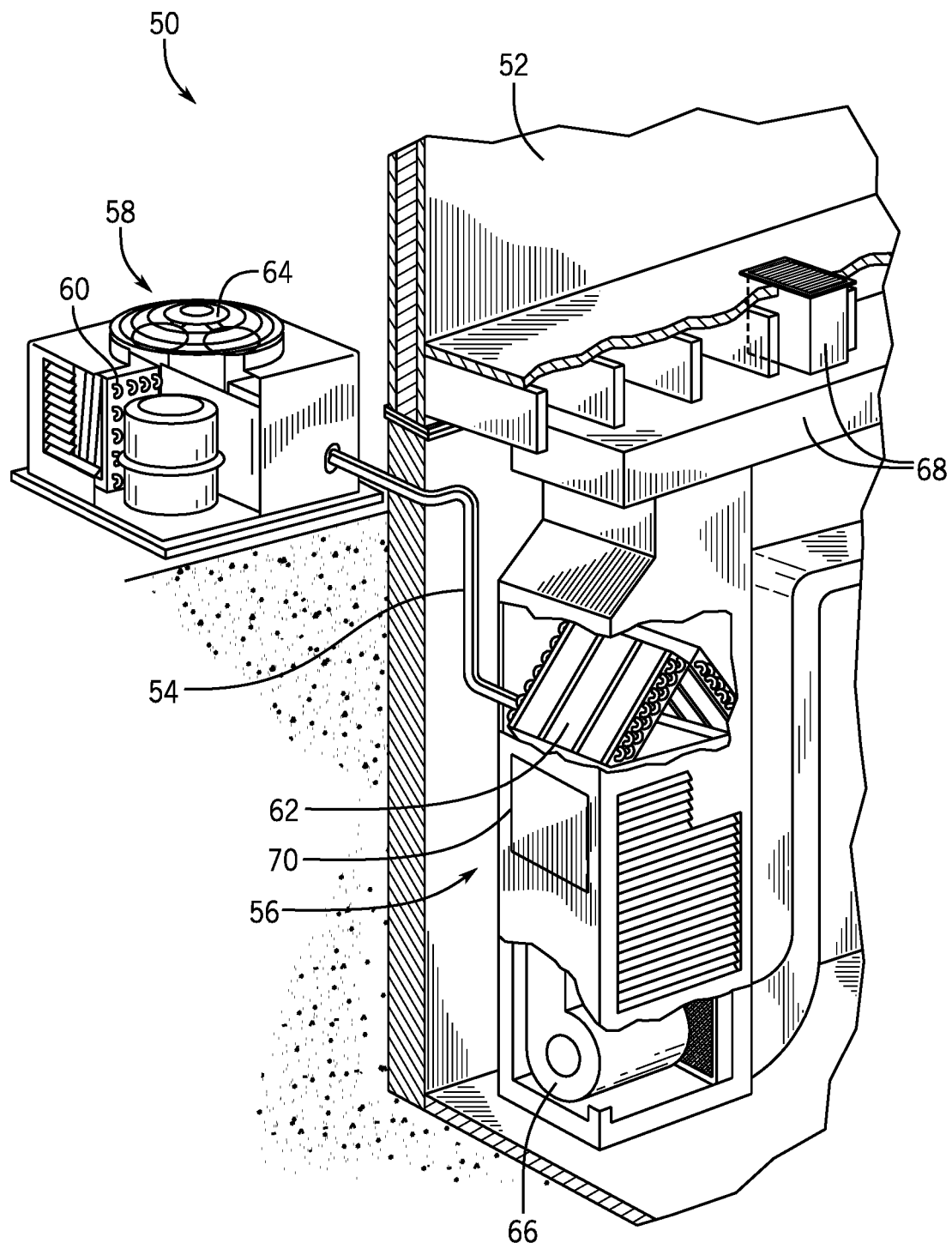
FIG. 3 is a perspective cutaway view of an embodiment of a split system of an HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
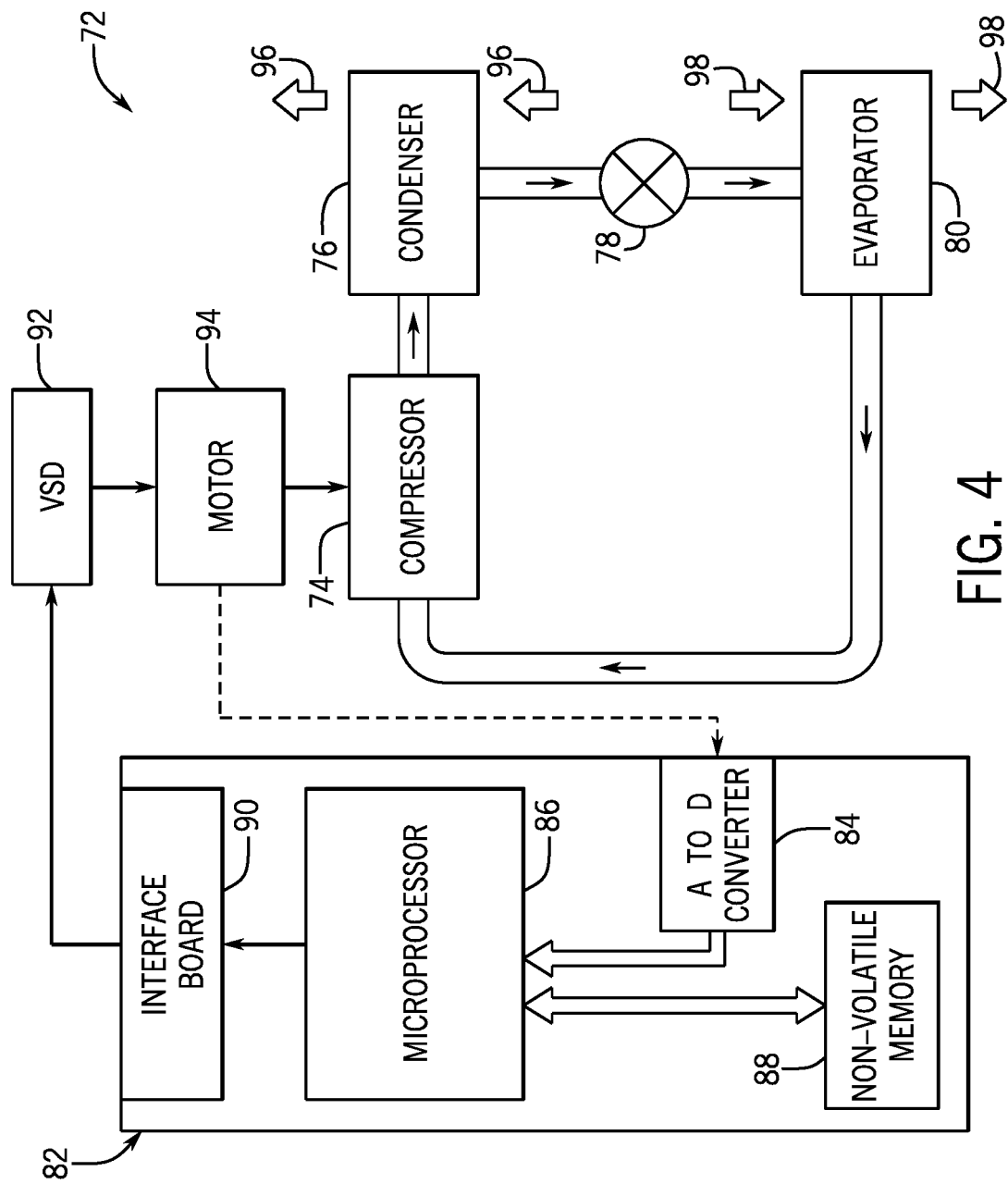
FIG. 4 is a schematic diagram of an embodiment of a vapor compression system of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth. As discussed below, in certain embodiments, the control panel 82 may include a clock that tracks a current time and date, and the non-volatile memory 88 may store information, such as predetermined or predefined threshold values, target values, or information about periods of time when debris is known or expected to increase in the outdoor environment.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications that include an outdoor air intake.

Figure 5:
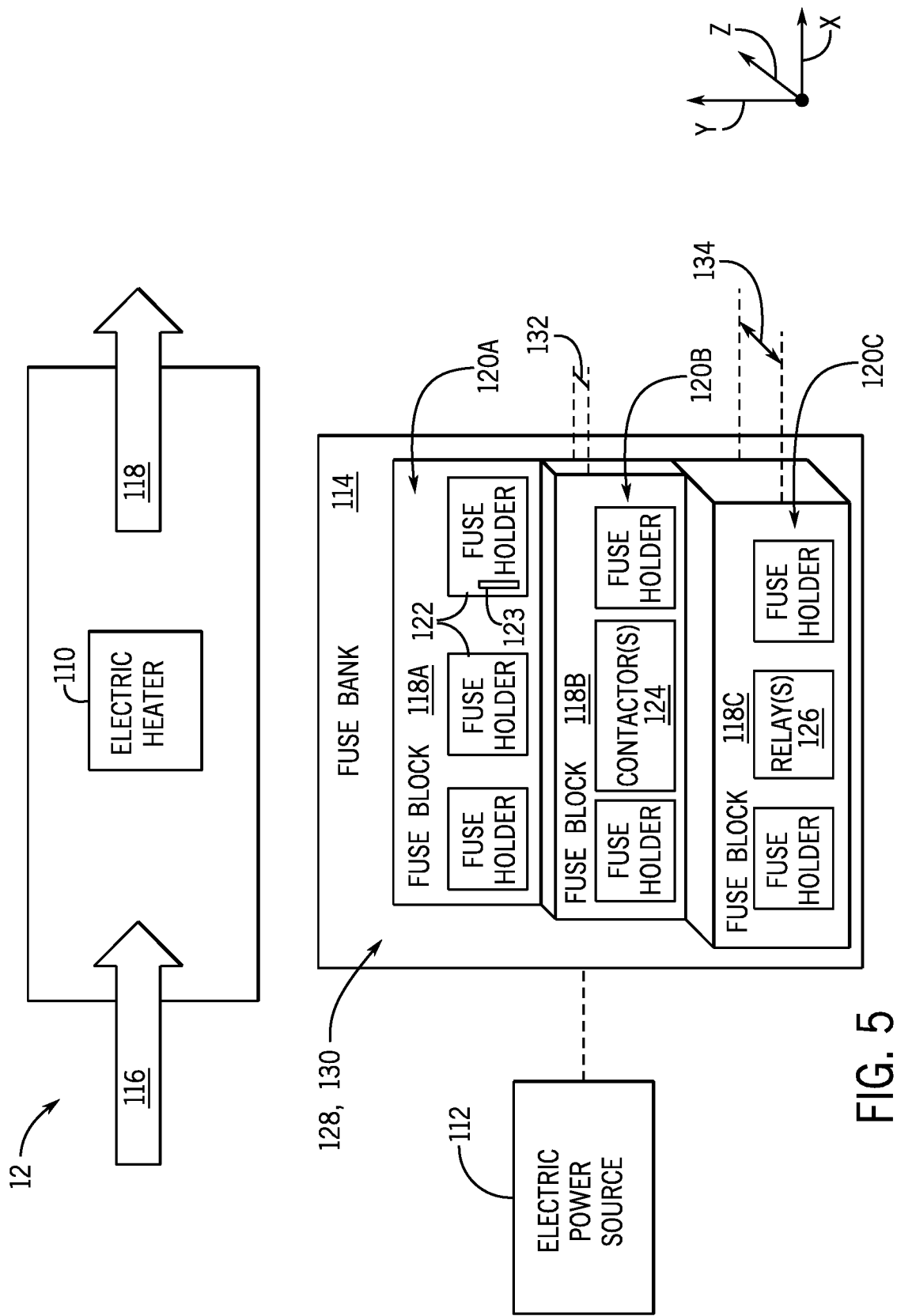
FIG. 5 is a diagram of a portion of an HVAC system that includes an electric heater and a stair-step fuse bank, in accordance with an aspect of the present disclosure.

With the foregoing in mind, FIG. 5 is a diagram of a portion of the HVAC unit 12 that includes an electric heater 110 that is supplied power from an electrical power source 112 via a stair-step fuse bank 114, in accordance with an embodiment of the present disclosure. For example, when the HVAC unit 12 is a large or commercial installation, such as a 50 ton unit, the electric heater 110 may be a kilowatt-scale electric heater that receives three-phase power from the electrical power source 112. During operation, the electric heater 110 generally generates heat via Joule heating, also known as resistive heating, wherein heat is generated by passing a current through a heating element of the electric heater 110 that warms air 116 traversing the HVAC unit 12.

For the illustrated embodiment, the stair-step fuse bank 114 includes three fuse blocks 118A, 118B, and 118C organized as horizontal rows 120A, 120B, and 120C of the fuse bank 114, respectively, wherein the horizontal rows 120 are aligned with the x-axis. As used herein, a "fuse block" is a collections of electrical components configured to deliver, transform, regulate, monitor, and/or condition power from the electrical power source 112 for consumption during operation of the electric heater 110. As such, the illustrated fuse blocks 118 include fuse holders 122, contactors 124, and relays 126, through which the current from the electrical power source 112 is routed to power the electric heater 110. Additionally, at least a portion of the fuse holders 122 are loaded with a suitable fuse 123, such as a slow-blow fuse. However, it may be appreciated that the fuse blocks 118 may include any suitable electrical components to deliver, transform, regulate, monitor, and/or condition the electrical power from the electrical power source 112 to the electric heater 110. Additionally, in certain embodiments, certain fuse blocks 118 may include the same electrical components. For example, in certain embodiments, the electrical power source 112 may be a three-phase electrical power source, and the fuse bank 114 may include three identical fuse blocks 118, each including the same fuses holders 122, contactors 124, and/or relays 126, and so forth, wherein each of the fuse blocks 118 receives and delivers a respective phase of the three-phase electrical power source 112.

Additionally, for the illustrated embodiment, a mounting surface 128 of the stair-step fuse bank 114 defines a rear vertical plane 130 (e.g., an x-y plane) of the fuse bank 114. The fuse block 118A of the first row 120A of the fuse bank 114 is attached to the mounting surface 128 of the fuse bank 114 and, therefore, is disposed adjacent to the rear vertical plane 130. The fuse block 118B of the second row 120B of the fuse bank 114 is disposed vertically below the fuse block 118A with respect to the y-axis. The fuse block 118 is separated from the mounting surface 128 of the fuse bank 114 and, therefore, is offset from the rear vertical plane 130 by a first distance 132. The fuse block 118C of the third row 120C of the fuse bank 114 is disposed vertically below the fuse blocks 118A and 118B with respect to the y-axis. The fuse block 118C is also separated from the mounting surface 128 of the fuse bank 114 and, therefore, is offset from the rear vertical plane 130 by a second distance 134 that is greater than the first distance 132. As such, the illustrated fuse bank 114 has a stair-step design that offsets the fuse blocks 118 in the z-direction such that they are out of vertical alignment with respect to the y-axis. As such, air warmed by the fuse block 118B does not rise to contact and heat fuse block 118A, and air warmed by the fuse block 118C does not rise to contact and substantially heat fuse blocks 118A and 118B.

FIG. 6 is a schematic illustrating a side view embodiment of the stair-step fuse bank 114, in accordance with an aspect of the present disclosure. In the illustrated embodiment, the stair-step fuse bank 114 includes a number of fuse blocks 118 disposed in a number of horizontal rows 120. More specifically, the illustrated stair-step fuse bank 114 includes four rows 120A, 120B, 120C, and 120D having fuse blocks 118A, 118B, 118C, and 118D, respectively. Additionally, the illustrated stair-step fuse bank 114 includes the mounting surface 128, which defines the rear vertical plane 130 of the example fuse bank 114. It may be appreciated that, in other embodiments, the stair-step fuse bank 114 may include any suitable number of rows 120 or fuse blocks 118, in accordance with the present disclosure.

For the illustrated embodiment, the first row 120A of the fuse bank 114 includes the fuse block 118A coupled directly to the mounting surface 128 of the fuse bank 114. The second row 120B includes the fuse block 118B, which is coupled to a spacer 140A that is, in turn, coupled to the mounting surface 128 of the fuse bank 114 vertically below the first row 120A. The third row 120C includes the fuse block 118C, which is coupled to a spacer 140B that is, in turn, coupled to the mounting surface 128 of the fuse bank 114 vertically below the second row 120B. The fourth row 120D includes the fuse block 118D, which is coupled to a spacer 140C that is, in turn, coupled to the mounting surface 128 of the fuse bank 114 vertically below the third row 120C. It may be appreciated that the fuse blocks 118, the spacers 140, and the mounting surface 128 may be coupled together using bolts, screws, pins, clips, or any other suitable coupling mechanism.

For the embodiment illustrated in FIG. 6, the spacers 140 may be made of any material having suitable structural and thermal properties to secure the fuse blocks 118B, 118C, and 118D to the mounting surface 128 of the stair-step fuse bank 114. For example, in certain embodiments, the spacers 140 may be made mostly or entirely from galvanized steel, which is advantageously cheap to manufacture, sufficiently strong and rigid to provide structural stability, and retains its structural integrity at the operating temperatures of the fuse blocks 118. Additionally, metallic spacers 140 are also thermally conductive and, therefore, offer better heat dissipation than spacers 140 made of non-metallic materials. It may be appreciated that, while the spacers 140 are illustrated as being hollow rectangular boxes, in other embodiments, the spacers 140 may have other suitable shapes and sizes, in accordance with the present disclosure.

Additionally, for the illustrated embodiment, the spacers 140A, 140B, and 140C each have a suitable depth or thickness, such as along the z axis, to yield the stair-step design. More specifically, the fuse block 118A is coupled to the mounting surface 128 and extends a first distance 142 from the rear vertical plane 130, wherein the first distance 142 also corresponds to a thickness 143 of the fuse block 118A. The spacer 140A is coupled to the mounting surface 128 of the fuse bank 114 and extends at least the first distance 142 from the rear vertical plane 130. The fuse block 118B is coupled to and extends a second distance 144 from a face 146 of the spacer 140A, corresponding to a thickness 145 of the fuse block 118B, such that the fuse block 118B is vertically offset from the fuse block 118A. In other words, the spacer 140A offsets the fuse block 118B in the z-direction such that the fuse blocks 118A and 118B are not aligned in they-direction. As used herein a "face" or "front face" of a spacer, bracket, or stand-off refers to the portion of the element onto which the fuse blocks 118 are attached. Additionally, the term "mounting surface" or "front mounting surface" can also be used herein in the context of a spacer, bracket, or stand-off to refer to the front face of the spacer, bracket, or stand-off onto which the fuse blocks 118 are attached, while the term "rear mounting surface" can be used to refer to a portion 148 of the spacer, bracket, or stand-off that is attached to the mounting surface 128 of the fuse bank 114.

For the embodiment illustrated in FIG. 6, the spacer 140B is coupled to the mounting surface 128 of the fuse bank 114 and extends a third distance 150 from the rear vertical plane 130, wherein the third distance 150 is at least the sum of the first distance 142 and the second distance 144. The fuse block 118C is coupled to and extends a fourth distance 152 from a face 154 of the spacer 140B, corresponding to a thickness 153 of the fuse block 118C, such that the fuse block 118C is vertically offset from the fuse block 118B. The spacer 140C is coupled to the mounting surface 128 of the fuse bank 114 and extends a fifth distance 156 from the rear vertical plane 130, wherein the fifth distance 156 is at least the sum of the third distance 150 and the fourth distance 152. The fuse block 118D is coupled to a face 158 of the spacer 140C such that the fuse block 118D is vertically offset from the fuse block 118C. As such, for the illustrated embodiment, each spacer 140A, 140B, and 140C has a respective thickness that is greater than or equal to the sum of the respective thicknesses of all fuse blocks 118 disposed vertically above the spacer 140 in the fuse bank 114.

Figure 7:
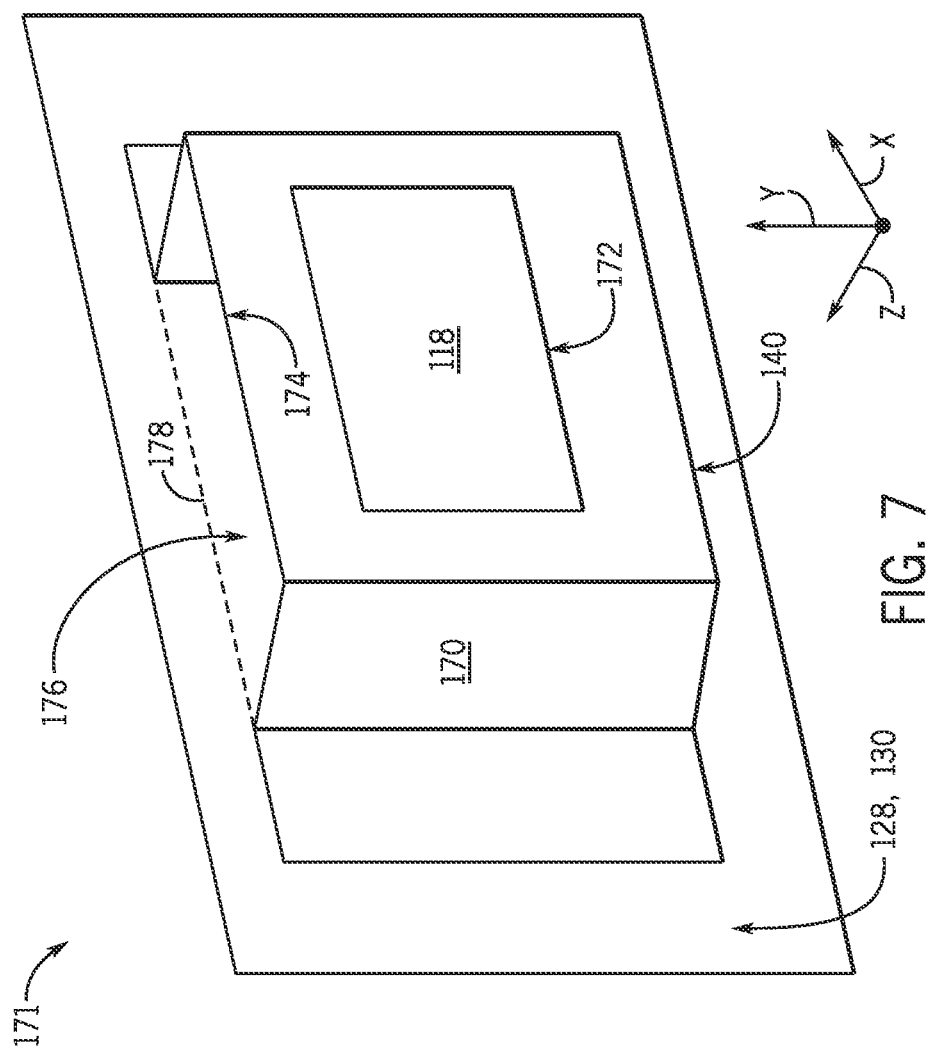
FIG. 7 is a schematic perspective view of an embodiment of a bracket designed to offset a fuse block from a mounting surface of the fuse bank, in accordance with an aspect of the present disclosure.

In certain embodiments, the spacers 140 may be in the form of brackets used to offset one or more fuse blocks 118 from the rear vertical plane 130 of the stair-step fuse bank 114. For example, FIG. 7 is a perspective view schematic of an embodiment of the spacer 140 in the form of a stand-off bracket 170 designed to couple one of the fuse blocks 118 to the mounting surface 128 of the stair-step fuse bank 114. In certain embodiments, the combination of the fuse block 118 and the bracket 170 may be referred to herein as a fuse block assembly 171. The illustrated bracket 170 is made of galvanized steel and is secured to the mounting surface 128 of the stair-step fuse bank 114 using bolts, screws, pins, or other suitable attachment features. For the illustrated embodiment, the bracket 170 includes a face 172 or front face onto which the fuse block 118 is attached. Opposite the front face 172, the bracket 170 includes a back face 174 that is separated from the mounting surface 128 to define an interior volume 176 of the bracket 170. For the illustrated embodiment, a top side and a bottom side of the bracket 170 are open, which enables air to freely move vertically though the interior volume 176 of the bracket 170. In other embodiments, the bracket 170 may include a top flange and/or bottom flange, as indicated by the dashed line 178, that at least partially encapsulates the interior volume 176, which increases the structural stability of the bracket 170.

Figure 8:
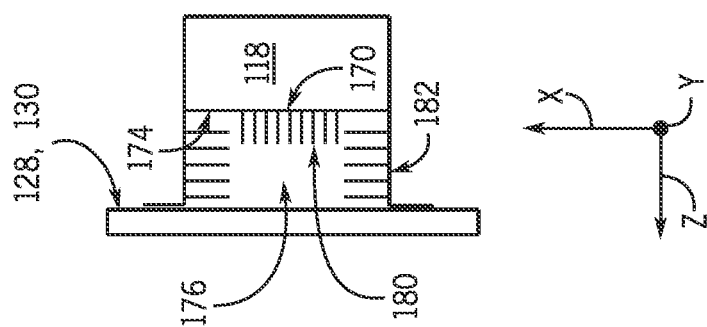
FIG. 8 is a schematic top-down view of the embodiment of the bracket of FIG. 7 having cooling fins, in accordance with an aspect of the present disclosure.

For embodiments in which air is free to move into and out of the interior volume 176 of the bracket 170, it is presently recognized that this can provide additional heat dissipation benefits to the fuse blocks 118 of the fuse bank 114. That is, for embodiments in which the bracket 170 is metallic, heat conducted into the bracket 170 from the fuse block 118 is dispersed throughout the bracket 170 and can be subsequently transferred into an air flow moving through the interior volume 176 of the bracket 170. In certain embodiments, the bracket 170 may include additional cooling features to facilitate this cooling effect. For example, FIG. 8 is a schematic illustrating a top-down view of the embodiment of the bracket of FIG. 7 having cooling fins 180, in accordance with an aspect of the present disclosure. The cooling fins 180 extend from the back face 174 and from side portions 182 into the interior volume 176, thereby increasing the surface area of the bracket 170 within the interior volume 176. As such, the illustrated embodiment of the bracket 170 enables enhanced heat dissipation relative to embodiments that lack the cooling fins 180. Additionally, in certain embodiments, other suitable types of brackets, such as Z-brackets, may be used to space or offset the fuse blocks 118 from the rear vertical plane 130, in accordance with the present disclosure.

Figure 9:
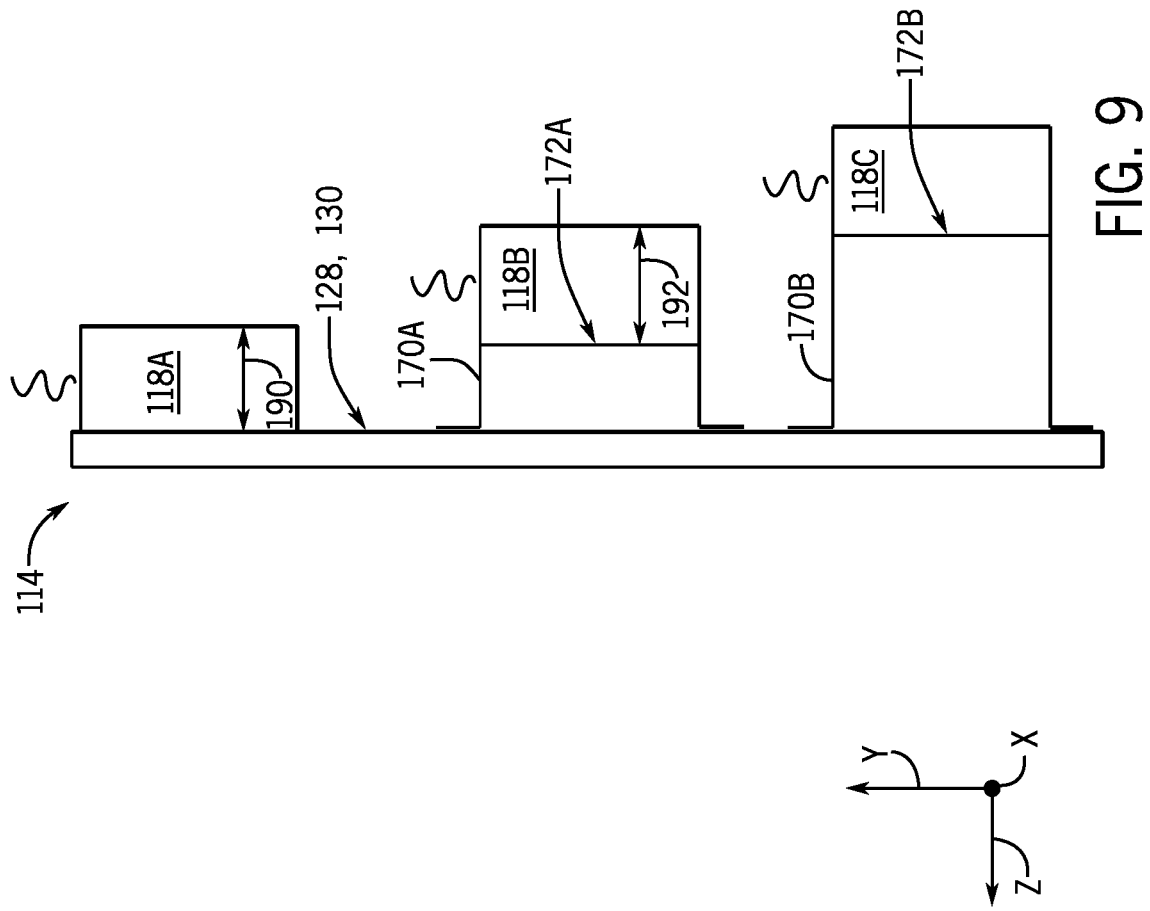
FIG. 9 is a schematic side view of an embodiment of the stair-step fuse bank that includes the embodiment of the bracket of FIG. 7, in accordance with an aspect of the present disclosure.

FIG. 9 is a schematic of a side view of an embodiment of the stair-step fuse bank 114 that includes brackets 170 of FIG. 7, in accordance with an aspect of the present disclosure. More specifically, the embodiment of the stair-step fuse bank 114 illustrated in FIG. 9 includes fuse blocks 118A, 118B, and 118C disposed in horizontal rows 120A, 120B, and 120C, respectively. The fuse block 118A is coupled to the mounting surface 128 of the fuse bank 114 and is disposed adjacent to the rear vertical plane 130 of the stair-step fuse bank 114. Bracket 170A is coupled to the mounting surface 128 vertically below the fuse block 118A, and the fuse block 118B is coupled to the face 172A of the bracket 170A. Bracket 170B is coupled to the mounting surface 128 of the fuse bank 114 vertically below the fuse block 118B, and the fuse block 118C is coupled to the face 172B of the bracket 170B. Additionally, the bracket 172A offsets fuse block 118B along the z-axis from the rear vertical plane 130 by at least a thickness 190 of the fuse block 118A, while the bracket 170B offsets the fuse block 118C along the z-axis from the rear vertical plane 130 by at least a sum of the thickness 190 of the fuse block 118A and a thickness 192 of the fuse block 118B, such the fuse blocks 118A, 118B, 118C are not vertically aligned along the y-axis. As such, warm air rising from the lower electrical components, such as fuse blocks 118B and 118C, does not contact and heat the upper electrical components, such as fuse block 118A, during operation of the electric heater 110. Additionally, it may be noted that the brackets 170B and 170C of FIG. 9 have been rotated 90° relative to the orientation of the bracket 170 illustrated in FIGS. 7 and 8, such that side portions 182 of the brackets 170B and 170C are open. In certain cases, the orientation illustrated in FIGS. 7 and 8 may be advantageous relative to this arrangement, since it enables vertical airflow through the interior volume 176 of the brackets 170 for enhanced cooling, as discussed above.

Figure 10:
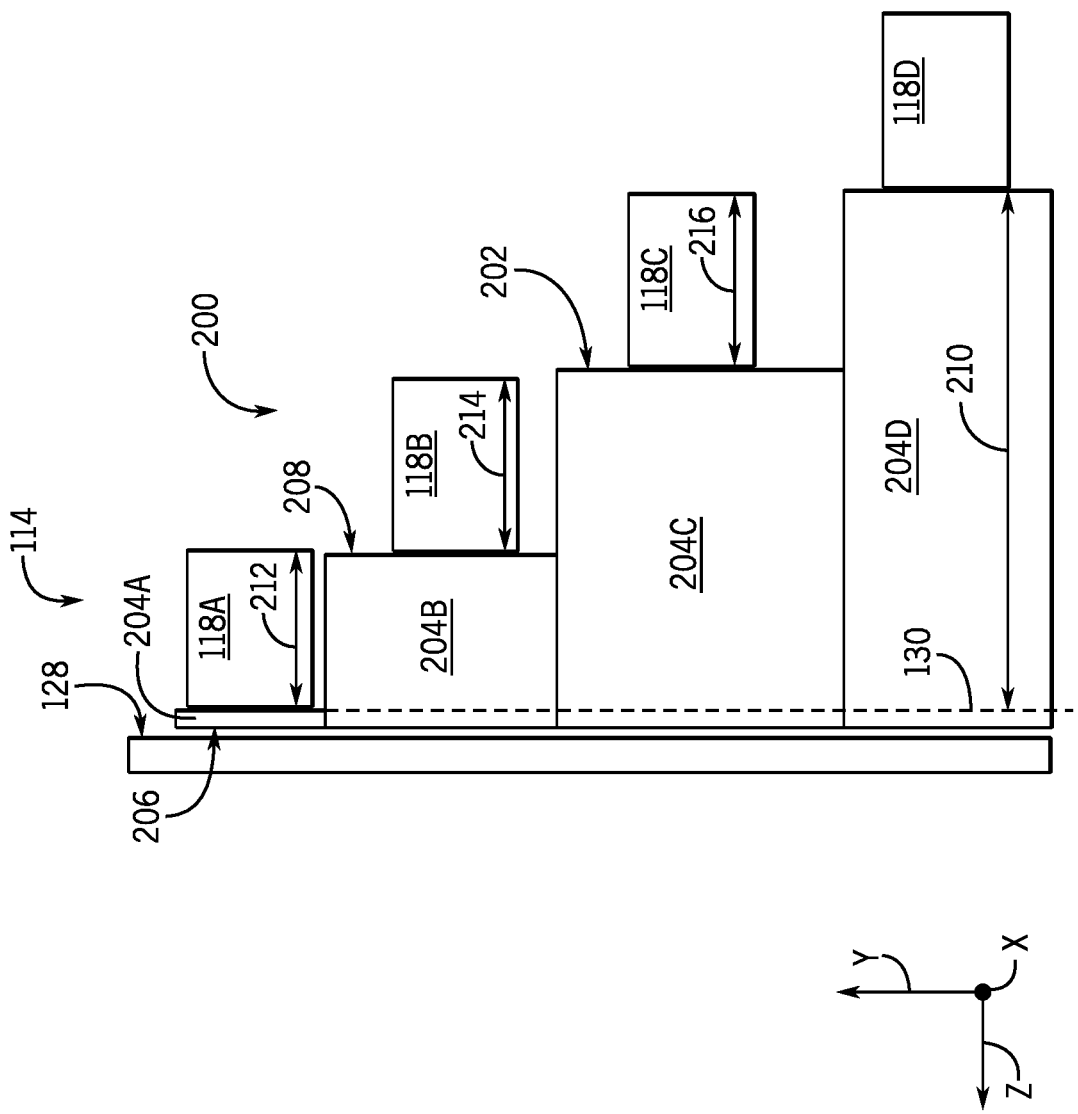
FIG. 10 is a schematic side view of an embodiment of the stair-step fuse bank that includes a fuse block assembly, in accordance with an aspect of the present disclosure.

FIG. 10 is a schematic side view of an embodiment of the stair-step fuse bank 114 that includes a fuse block assembly 200, in accordance with an aspect of the present disclosure. For the illustrated embodiment, the fuse block assembly 200 includes a multi-level spacer 202 having integral stair-step extensions 204A, 204B, 204C, and 204D with a number of fuse blocks 118 attached. A rear surface 206 of the multi-level spacer 202 is coupled to the mounting surface 128 of the fuse bank 114, while a front face or mounting surface 208 of the multi-level spacer 202 is coupled to fuse blocks 118. The fuse blocks 118A, 118B, 118C, and 118D are coupled as horizontal rows 120A, 120B, 120C, and 120D, respectively, to form the fuse block assembly 200. Like the embodiments discussed above, the integral stair-step extensions 204 of the multi-level spacer 202 are suitably shaped to ensure that the fuse blocks 118 are arranged out of vertical alignment along the y-axis, such that air heated by the lower fuse blocks 118 does not rise to contact the fuse blocks 118 disposed above.

It may also be appreciated that, for the illustrated embodiment, the uppermost fuse block 118A is coupled to the first integral stair-step extension 204A of the multi-level spacer 202, rather than the mounting surface 128 of the fuse bank 114. As such, for the illustrated embodiment, the rear vertical plane 130 of the illustrated fuse bank 114 is defined within the x-y plane where the fuse block 118A is coupled to the multi-level spacer 202. As such, the integral stair-step extensions 204 of the multi-level spacer 202 ensure that each of the fuse blocks 118B, 118C, and 118D are respectively disposed at a distance from the rear vertical plane 130 that is at least the sum of the thicknesses of all fuse blocks 118 disposed above. For example, the multi-level spacer 202 ensures that the fuse block 118D is disposed a distance 210 from the rear vertical plane 130 that is at least the sum of the respective thicknesses 212, 214, 216 of fuse blocks 118A, 118B, and 118C.

FIG. 11 is a schematic side view of an embodiment of the stair-step fuse bank 114 having angled fuse blocks 118, in accordance with an aspect of the present disclosure. The illustrated embodiment of the stair-step fuse bank 114 includes fuse blocks 118A, 118B, and 118C arranged in horizontal rows 120A, 120B, and 120C, respectively. For the illustrated embodiment, fuse block 118A is coupled to an angled bracket 220A, which is, in turn, coupled to the mounting surface 128 of the stair-step fuse bank 114. Fuse block 118B is coupled to an angled bracket 220B, which is, in turn, coupled to the mounting surface 128 of the stair-step fuse bank 114 below the fuse block 118A. Fuse block 118C is coupled to an angled bracket 220C, which is, in turn, coupled to the mounting surface 128 of the stair-step fuse bank 114 below the fuse block 118B. Like those discussed above, the angled brackets 220 may be made of galvanized steel or another suitable structural material.

Additionally, for the embodiment illustrated in FIG. 11, each of the fuse blocks 118 is disposed at an angle 222 with respect to the mounting surface 128 or the rear vertical plane 130 of the stair-step fuse bank 114. That is, while the fuse blocks 118 of the embodiments discussed above are oriented approximately perpendicularly to the mounting surface 128, the fuse blocks 118 of FIG. 11 are disposed at the angle 222, which is less than 90°. For example, in certain embodiments, the angle 222 may be between 70° and 20°, such as approximately 45°. In certain embodiments, each of the angled brackets 220 may be disposed at a different angle, such as from smallest angle at the top to the largest angle at the bottom of the fuse bank 114. As a result of the angled orientation of the fuse blocks 118, it is believed that substantially less of the air warmed by the lower fuse blocks 118B and 118C will rise to contact and heat the upper fuse block 118A during operation of the electric heater 110. Additionally, for the illustrated embodiment, bottom edges 224 of the angled brackets 220 are also angled to direct warm air generated below away from the fuse blocks 118 to limit convection-based heating of the electrical components during operation. In other embodiments, the angled brackets 220 may additionally or alternatively vary in size, such as from a smallest size on top to a largest size on bottom of the fuse bank 114.

The technical effects of the present disclosure include a stair-step fuse bank design. Within this disclosed stair-step fuse bank design, each fuse block is vertically offset such that the upper electrical components of the fuse bank are not disposed directly above the lower electrical components of the fuse bank. This substantially reduces the convection heating of the upper electrical components by the lower electrical components of the fuse bank. As discussed below, the stair-step fuse block design may be achieved in a number of different manners, such as using brackets and/or spacers. As such, the disclosed stair-step fuse bank design enables the upper electrical components to operate at or over rated voltages for extended periods without failure and/or enables extension of the life of the upper electrical components by limiting thermal exposure during operation.

The invention claimed is:

1. A fuse bank for a heating, ventilation and/or air conditioning (HVAC) system, comprising:
    a mounting surface;
    a first fuse block including a first fuse holder coupled to the mounting surface;
    a spacer coupled to the mounting surface vertically below the first fuse block, wherein the spacer includes a stand-off bracket that defines a volume between a back face of the stand-off bracket and the mounting surface; and
    a second fuse block including a second fuse holder coupled to the spacer, wherein the spacer offsets the second fuse block from the mounting surface of the fuse bank in a stair-step arrangement.

2. The fuse bank of claim 1, wherein the first fuse holder extends a first distance from the mounting surface, and wherein the spacer offsets the second fuse block from the mounting surface by at least the first distance.

3. The fuse bank of claim 2, wherein the second fuse holder extends a second distance from a face of the spacer, and including:
    a second spacer coupled to the mounting surface vertically below the second fuse block; and
    a third fuse block including a third fuse holder coupled to the second spacer, wherein the second spacer offsets the third fuse block by at least a sum of the first distance and the second distance from the mounting surface.

4. The fuse bank of claim 3, wherein the third fuse holder extends a third distance from an additional face of the second spacer, and including:
    a third spacer coupled to the mounting surface vertically below the third fuse block; and
    a fourth fuse block including a fourth fuse holder coupled to the third spacer, wherein the third spacer offsets the fourth fuse block by at least a sum of the first distance, the second distance, and the third distance from the mounting surface.

5. The fuse bank of claim 1, wherein the stand-off bracket includes a top flange and a bottom flange that enclose the volume.

6. The fuse bank of claim 1, wherein a top side and a bottom side of the stand-off bracket are open to enable airflow through the volume.

7. The fuse bank of claim 1, comprising one or more cooling fins disposed within the volume and coupled to the back face of the stand-off bracket.

8. The fuse bank of claim 1, wherein the stand-off bracket includes a z-bracket.

9. The fuse bank of claim 1, wherein the first fuse block or the second fuse block includes a contactor and a slow-blow fuse.

10. The fuse bank of claim 1, wherein the first fuse block or the second fuse block includes a relay.

11. The fuse bank of claim 1, wherein the first fuse block and the second fuse block are electrically coupled to an electric heater of the HVAC system.

12. A fuse block assembly for an electric heater, comprising:
    a mounting surface;
    a first fuse block positioned along a first row of the fuse block assembly and including a first set of fuse holders coupled to a first portion of the mounting surface, wherein the first set of fuse holders extends a first distance from a rear vertical plane defined by the fuse block assembly; and
    a second fuse block positioned along a second row of the fuse block assembly and including a second set of fuse holders coupled to a second portion of the mounting surface, wherein the second set of fuse holders is offset from the rear vertical plane by a second distance that is greater than the first distance, and wherein the first fuse block or the second fuse block is disposed at an angle less than 90 degrees relative to the rear vertical plane.

13. The fuse block assembly of claim 12, wherein the second set of fuse holders extends a third distance from the mounting surface of the fuse block assembly and comprising a third fuse block positioned along a third row of the fuse block assembly and including a third set of fuse holders coupled to a third portion of the mounting surface and positioned at a fourth distance from the rear vertical plane, wherein the fourth distance is greater than or equal to a sum of the second distance and the third distance.

14. The fuse block assembly of claim 12, comprising a multi-level spacer that includes the mounting surface, wherein the mounting surface of the multi-level spacer includes a first integral stair-step extension having the first portion of the mounting surface and includes a second integral stair-step extension having the second portion of the mounting surface.

15. The fuse block assembly of claim 14, wherein the multi-level spacer includes a rear surface configured to couple to a fuse bank mounting surface to yield a fuse bank having a stair-step arrangement.

16. A heating, ventilation and/or air conditioning (HVAC) system, comprising:
   an electric heater;
   a fuse bank electrically coupled to the electric heater, wherein the fuse bank includes:
      a mounting surface;
      a first fuse block that extends a first distance from the mounting surface;
      a second fuse block mounted to a first face of a first bracket, wherein the first bracket is coupled to the mounting surface vertically below the first fuse block and spaces the second fuse block from the mounting surface by at least the first distance, and wherein the second fuse block extends a second distance from the first face of the first bracket; and
      a third fuse block mounted to a second face of a second bracket, wherein the second bracket is coupled to the mounting surface vertically below the second fuse block and spaces the third fuse block from the mounting surface by at least a sum of the first distance and the second distance.

17. The HVAC system of claim 16, wherein the third fuse block extends a third distance from the second face of the second bracket, and including a fourth fuse block mounted to a third face of a third bracket, wherein the third bracket is coupled to the mounting surface vertically below the third fuse block and spaces the fourth fuse block from the mounting surface by at least a sum of the first distance, the second distance, and the third distance.

18. The HVAC system of claim 16, wherein each of the first fuse block, the second fuse block, and the third fuse block are configured to supply a respective phase of a three-phase power source to the electric heater.

19. The HVAC system of claim 16, wherein the first and second brackets consist essentially of galvanized steel.

20. The HVAC system of claim 16, wherein the first fuse block, the second fuse block, or the third fuse block includes a relay or a contactor.

21. The HVAC system of claim 16, wherein the first fuse block, the second fuse block, or the third fuse block includes a fuse configured to operate above a rated capacity of the fuse.

22. The fuse block assembly of claim 12, comprising a spacer configured to offset the second set of fuse holders from the rear vertical plane by the second distance, wherein the spacer includes a stand-off bracket that defines a volume between a back face of the stand-off bracket and the second portion of the mounting surface.

* * * * *